July 9, 1935.  H. SCHULMAN  2,007,878
AIRCRAFT
Filed July 31, 1934  2 Sheets-Sheet 1
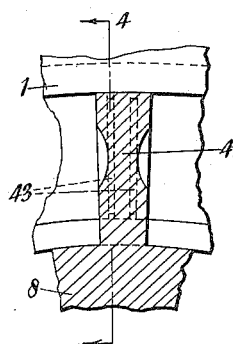
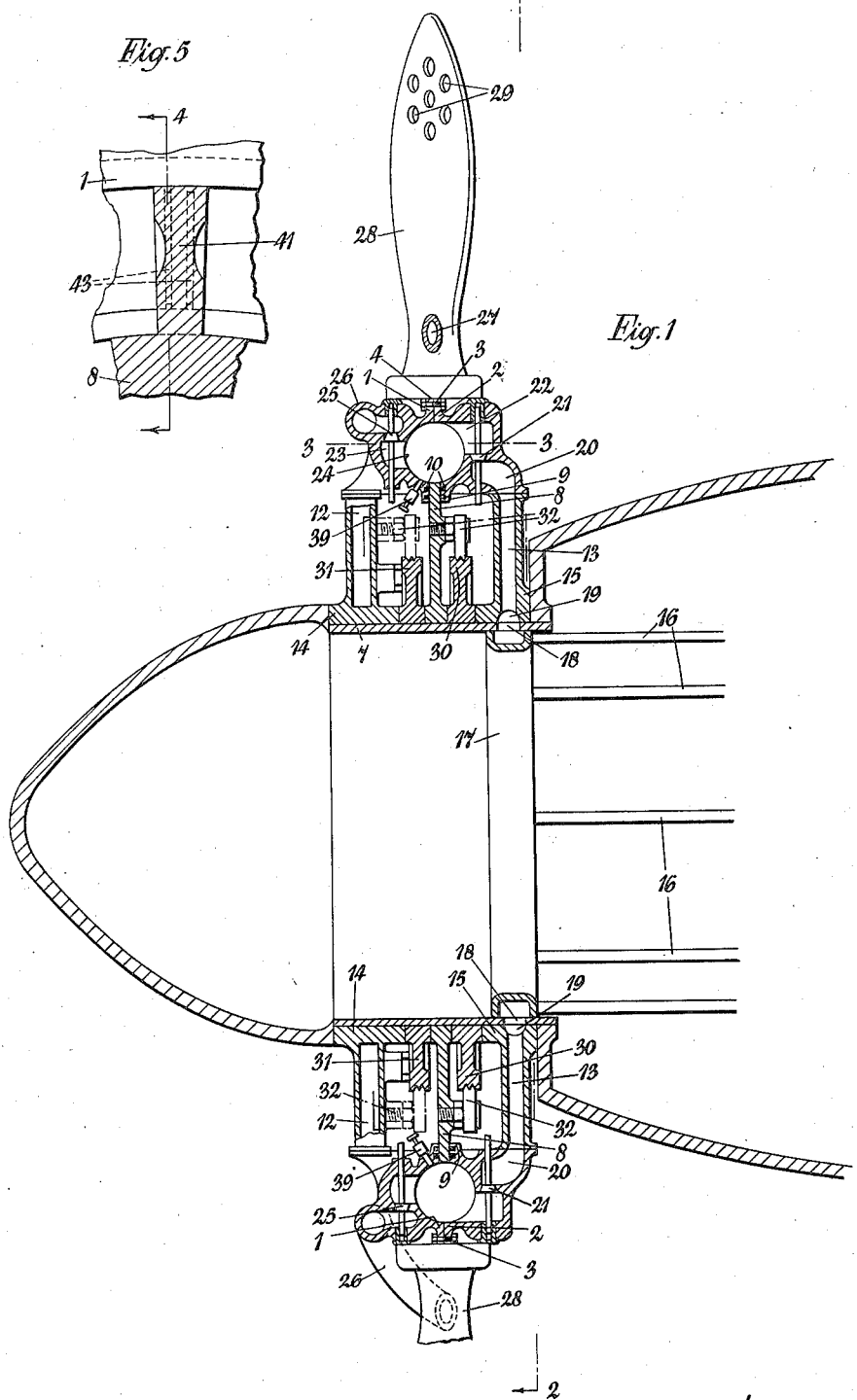

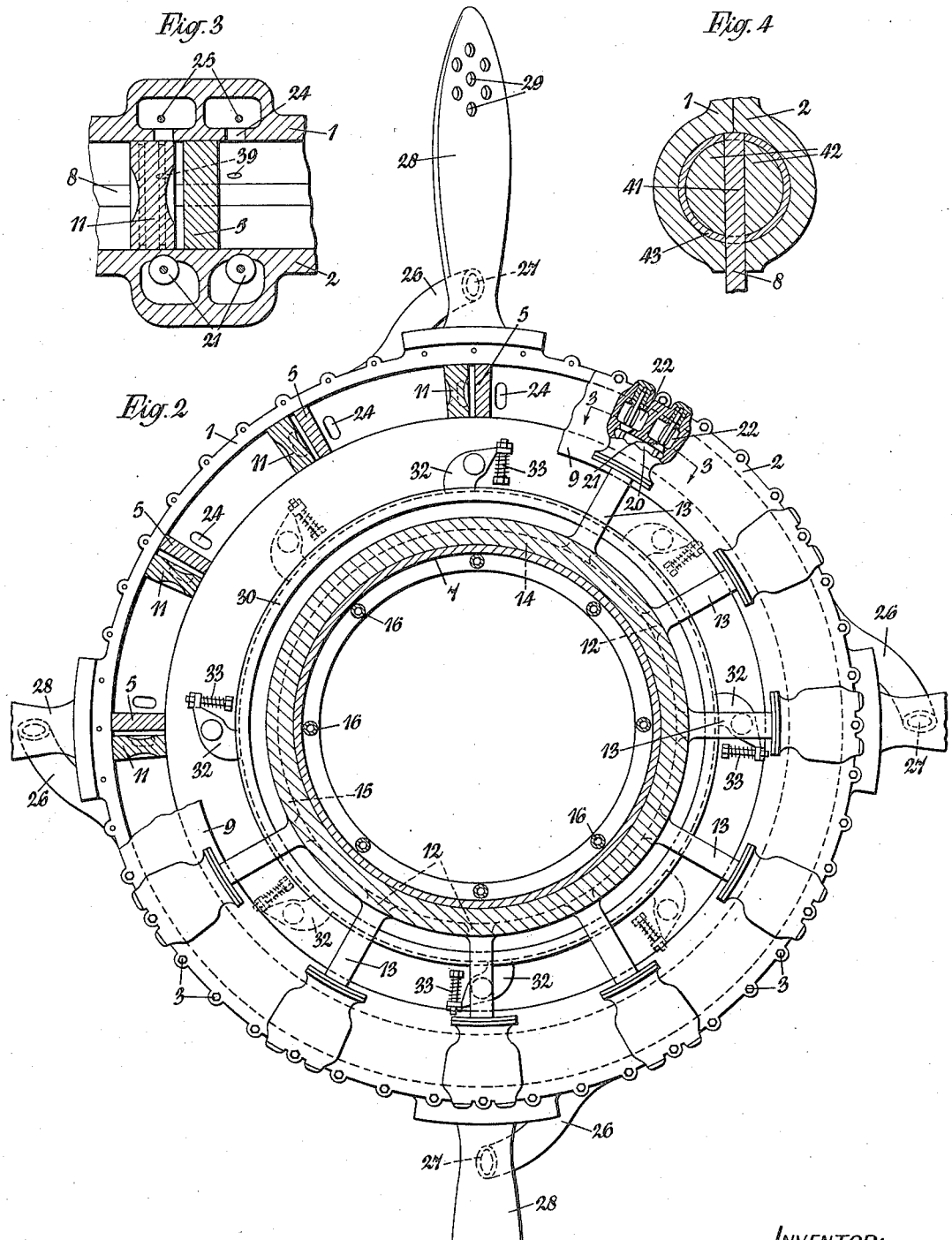

UNITED STATES PATENT OFFICE 2,007,878

AIRCRAFT

Henry Schulman, Pangbourne, England

Application July 31, 1934, Serial No. 737,802
In Great Britain June 30, 1931

2 Claims. (Cl. 244—25)

This invention relates to aircraft and comprises subject matter divided out of my co-pending application Serial No. 618,788, filed 22nd June 1932.

In the specification of said application Serial No. 618,788 I have described an improved construction of rotary internal combustion engine according to which the engine comprises a toroidal rotary multi-cylinder unit, a co-operating rotary multi-piston unit coaxial with the cylinder unit and in double-acting relation thereto, valve and ignition means operable to occasion explosions alternately on opposite sides of the piston, those on one side producing power strokes of the cylinder unit to cause rotation thereof and those on the other side producing auxiliary firing strokes of the piston unit causing rotation thereof in the same direction as that of the cylinder unit and serving to return the two units to their initial relative positions at the commencement of the power strokes and means to prevent reverse rotation of the piston unit during the power strokes of the cylinder unit and of the cylinder unit during the auxiliary strokes of the piston unit.

Preferably, the relative mass and distribution thereof of the two units is such that the cylinder unit has a moment of inertia substantially exceeding that of the piston unit and constitutes thereby a fly wheel in the engine.

Also, again according to a preferred construction, the rotary multi-cylinder unit consists of a hollow tore circumferentially slotted completely around the entire periphery of its wall and subdivided interiorly into a plurality of double-ended cylinders by a series of equally spaced transverse partitions and the co-operating rotary multi-piston unit consists of a group of equally spaced pistons working within each of said cylinders and mounted upon a carrier member which is external to the cylinder tore and comprises a part which in a gas-tight manner blocks the circumferential slot therein.

As described in my said specification No. 618,788, the rotary engine of this novel construction is specially adapted for use as the power unit of an aircraft propulsion plant, the rotary toroidal cylinder unit of the engine having propeller blades mounted directly upon it so that as the said cylinder unit rotates the propeller blades are carried around with it.

Thus, with an engine of said novel construction, there is a total absence of mechanical interconnection as between the two rotating units, with the complexity of parts which inevitably characterizes such an interconnection, and in consequence the engine is less liable to failure during flight of the aircraft and in addition is lighter and of enhanced efficiency.

Again, since the propeller blades are mounted directly upon the periphery of the cylinder unit and therefore all power losses of transmission as between the location of point of generation of the engine effort and that of the point of its utilization are eliminated, the propulsion plant incorporating the engine is of still further enhanced efficiency of operation and lightness of weight.

Moreover, since in an aicraft propulsion plant incorporating the engine according to the arrangement described, the only factor practically delimitative of the size of the cylinder tore is the maximum permissible radius of propeller sweep, the arrangement lends itself to the convenient obtainment of very high developable horse-powers, relative to the general dimensions and weight of the engine of the plant, for the practicable and permissible ratio as between the outside diameter of the cylinder unit and the diameter of the propeller sweep, is always a ratio of a very substantial order of magnitude, enabling a large number of simultaneously firing cylinders to be arranged around the circumferential length of the cylinder tore.

Furthermore, the engine of such an aircraft propulsion plant usefully occupies the central dead-effort zone of the conventional propeller, which feature still further contributes to compactness, lightness and general mechanical efficiency of the plant.

The present invention contemplates the use in an aircraft of a propulsion plant of the foregoing description, and is based upon the observation that, on account principally of the aforesaid absence of mechanical interconnection between the two rotating units of the engine, for all practical purposes the engine of the plant may quite conveniently be constructed in the form of a large ring, that is to say with a substantial sized through-way extending axially through the engine; and the underlying idea in the invention is to utilize this fact by constructing the engine in the form referred to and disposing it actually around the fuselage or engine gondola of the aircraft so that said fuselage or gondola projects through the axial through-way of the engine to a point in front of it, or in the case, for example, of a twin engine aeroplane, around an annular support for the engine of corresponding diameter to the through-way of the engine.

Several advantages accrue from this arrangement.

For example, the various ignition leads, fuel conduits, lubricating connections, control leads and the like are more readily and conveniently accommodated, than where there is no large axial through-way to the engine, and where in consequence the various parts referred to have all to be accommodated within a relatively small area near the centre of rotation of the engine units.

Also, with the arrangement according to the invention the various ignition leads, fuel conduits, and other parts referred to are readily accessible if at any time they should require attention, for example, while the aircraft is in flight, it being understood in this connection that the said axial through-way in the engine is preferably large enough in diameter to permit a man at least to crawl into the nose of the fuselage, gondola or the like abreast of the engine, although, of course, according largely to the general design and size of the aircraft, it may be of any desired diameter at all within the limits of practicability in the circumstances.

A further advantage of the improved arrangement according to the invention is that the reaction stresses exercised in the structure of the fuselage or the like in resistance of the driving torque developed in the engine are more generally distributed than in the conventional case where the engine is mounted upon the extreme nose of the fuselage.

Another advantage still is that the stream-line nose of the fuselage, gondola or the like projecting forwardly beyond the general plant of the engine and propeller blades functions to direct the air stream immediately across the path of the effective portion of the blades, with consequent increase of traction efficiency of the plant.

The invention comprises, therefore, in combination, an aircraft fuselage, gondola or similar engine carrying part (hereinafter for brevity referred to generically as a fuselage), a rotary internal combustion engine generally of the construction and principle of operation described in my said specification No. 618,788 (hereinafter referred to as a rotary internal combustion engine of the type specified), the said engine being constructed of sufficiently large axial through-way form to encircle the fuselage and being mounted thereon so that the fuselage reaches completely through the engine, and propeller blades mounted upon the cylinder unit of the engine, said cylinder unit being the unit which rotates during the power strokes of the engine.

The invention will now be further described with reference to the accompanying drawings which are more or less diagrammatic, and of which, Figure 1 is an axial section through a propulsion plant in accordance with the invention, in position upon the nose of an aeroplane fuselage;

Figure 2 is a corresponding transverse section, taken along the section line 22 of Figure 1;

Figure 3 is a section through one of the pistons and the ends of two adjacent cylinders of the engine of the plant, taken along the section line 3—3 of Figures 1 and 2, and Figures 4 and 5 are, respectively, a fragmentary longitudinal section and a fragmentary transverse section, through the cylinder unit of the engine, showing an alternative method of construction of the piston-unit.

Like reference numerals indicate like parts in the various figures.

The engine comprises an annular cylinder-unit embodying a group of twelve cylinders, three in each quarter of the unit. The said cylinder-unit is built up of two complementary halves 1, 2, each in the form of a dished ring. The two halves 1, 2 are bolted together by means of closely spaced bolts 3 passing through flanges or lugs 4 cast to receive them around the outer peripheries of the halves 1, 2. As shown in Figure 1, the annular cavity between the two complementary cylinder halves 1, 2, is of circular radial cross-section, and located at regularly spaced intervals around this cavity are a succession of twelve radial partitions 5, bolted in place by means of bolts reaching completely through the cylinder unit. These partitions have a gas-tight fit with the walls of the cylinder halves and they constitute conjointly with said halves, a group of concentric arcuate cylinders.

The unit is revolubly mounted upon a stationary sleeve 7 virtually constituting the wall of the aeroplane fuselage nose.

Revoluble also upon said sleeve 7 in the same direction as the cylinder unit, is a disc 8. The outer peripheral margin of this disc is, as clearly shown in Figure 1, inserted between the inner peripheral margins of the two complementary cylinder halves 1, 2, flanges 9 being formed on these margins to extend the surface-area of contact thereof with the margin of the disc 8, it being understood, of course, that there must be no escape of gas past these surfaces, either to or from the interior of the cylinders. To this end, packing means, for example, a series of concentric packing rings 10, are preferably provided between the said surfaces.

Mounted upon the periphery of the disc 8 are a series of twelve pistons 11, equally spaced around the circumference of the disc and accommodated each within a cylinder of the cylinder unit.

Therefore, it will be seen that the cylinder ring and piston disk surround the fuselage very closely adjacent thereto so that the engine does not project an appreciable distance above the fuselage, thereby reducing wear resistance and maintaining the substantially circular contour of the fuselage throughout the nose portion including the engine mounting portion thereof.

The cylinder unit is provided with two sets of hollow radial spokes 12, 13, projecting from bosses 14, 15, revoluble on the sleeve 7. The outer ends of these spokes 12, 13, were connected to lateral branches projecting from and integral with the cylinder-unit.

Conduits 16 feed carburetted fuel for ignition in the cylinders, by way of an annular induction manifold 17 extending around the inner wall of the sleeve 7 in the general plane of the boss 15. This manifold has in its outer wall outlet ports 18 which register with an annular port-passage 19 in the boss 15. This port-passage 19 in turn communicates with the interior, at the inner end, of the hollow spokes 13. At the outer end, the interior of these spokes communicates with fuel passages 20 in the rearward (right hand in Figure 1) lateral branches aforesaid projecting from the cylinder-unit.

In said rearward lateral branches are mounted inlet valves 21 which control the admission of carburetted gas mixture from the passages 20 in the branches to the spaces between the partitions 5 and the pistons 11 on either side thereof.

Figure 3 clearly illustrates the construction in this respect. As shown in that figure, each lateral inlet branch has in it two passages 20 controlled, respectively, by two inlet valves 21. The gas mixture after passing the valve 21 is admitted, in each case, directly into the cylinder by way of a circumferential inlet port 22.

The lateral branches projecting from the other side of the cylinder unit constitute exhaust branches. They are formed with internal outlet passages 23 leading from circumferential outlet ports 24 in the walls of the cylinders. These outlet passages 23 are separately controlled by exhaust valves 25, and the exhaust gases, after passing the valves 25 enter exhaust manifolds 26. From the ends of these manifolds the gases pass, by way of ports 27, into the interior of hollow propeller blades 28, mounted upon the periphery of the cylinder-unit and provided in their faces, near the extremity of the blades, with exhaust outlet holes 29 communicating with the atmosphere.

The inlet and exhaust valves 21, 25, are actuated, of course, in time with one another and with the relative reciprocation of the pistons 11 and the cylinders within which they work. Their actuating mechanism (not shown) may take any convenient form. For example, it may comprise a system of cam-discs engaging shoes or rollers on the inner end of the valve stems. Alternatively, the valves may be electro-magnetically actuated, the electro-magnets being arranged to lift the several valves, in their timed sequence, against a yielding-control tending always to close them, and being operatively associated with a rotary switch driven by the engine in unison with the movements of the cylinder and piston units.

In order to obtain the relative reciprocation of the pistons in their cylinders, the two units are provided with detent means operable to prevent their backward rotation when the unit which is performing its firing stroke is moving forwardly.

The said detent means may take any convenient form. In the form shown, it comprises, in the case of each unit, a ring 30 (31) mounted upon and stationary with the sleeve 7, and co-operating with the periphery of this ring, a series of wedging dogs 32 normally held in light rubbing engagement with the periphery of the ring 30 (31) by compression springs 33. There are two sets of such dogs 32, one set co-operating with the ring 30 and the other set with the ring 31. The set which co-operates with the ring 30 is pivotally mounted upon the rear face of the piston disc 8. The other set is mounted upon the radial spokes 12 of the cylinder-unit. As will be understood, these two sets of dogs 32 operate momentarily to prevent backward rotation of the parts upon which they are mounted, by permitting relative rotation of the pivots of the dogs and the rings 30 (31) in one direction only, namely, the direction of rotation of the piston and cylinder units. The dogs immediately resist any tendency to rotation in the opposite direction by wedge-gripping the peripheries of the rings 30, 31. These peripheries are preferably grooved in a circumferential direction, as shown, to extend their surface-area of engagement with the dogs.

The engine also comprises a magneto and a lubricating pump, these mechanisms being driven by a gear wheel rotatable with the boss 15 and meshing with pinions fast, respectively, with the spindles of the magneto and pump. These parts are not shown.

The ignition means of the engine comprises, as usual sparking plugs. These plugs 39 are fitted in the cylinder walls close to the partitions 5 which separate the cylinders. The electric leads from the plugs are led down to the interior of the stationary sleeve 7 by way of the hollow spokes 12 and suitably arranged leading-in tubes (not shown) from whence they are led along said sleeve 7 to the distributor of the magneto.

The means for securing the ignition of the compressed charges at the right moment is not indicated, but any convenient ignition means may be employed so as to ignite the charges in the cylinders when the cylinder-units and piston-units come into their proper working positions. The ignition system may be either a system of coil ignition or a system of magneto ignition. In the latter event, the magneto 34 would, as usual, incorporate a distributor connected up in an appropriate manner, well understood in the art, to the several sparking plugs 39. If, on the other hand, a system of coil ignition be employed, the magneto 34 would be substituted by a suitable generator which, as usual, would supply current to a battery, in turn wired up to the plugs 39 through the intermediary of an induction coil, make-and-break device, and distributor, the generator preferably, moreover, being provided with a direct connection to the induction coil by-passing the battery.

As will be observed from the foregoing description, the engine operates on the principle of the four-stroke cycle, the cylinder unit strokes being the power strokes and the piston unit strokes the auxiliary strokes which serve to return the two units to their initial power stroke firing positions in relation to one another.

It will be seen from the accompanying drawings, that the cylinder-unit is considerably more massive than the piston-unit. This is an important feature, for the excess of weight in the cylinder-unit over the piston-unit provides a flywheel effect in the rotation of the parts, with the result that if the said excess of weight is sufficient, the rotation of the cylinder-unit may be rendered substantially continuous, the piston-unit performing its reciprocation relatively to the cylinder unit by moving alternately faster and slower than that unit.

Referring now to Figures 4 and 5 the modified construction of piston-unit illustrated in these figures is one in which the piston disc 8 is formed with radial projections 41 at each piston positioned around its periphery. These projections 41 are integral with the disc and in effect constitute in each case a central section of the piston, the two side sections 42 of which are of cylindrical contour and are bolted on to the opposed faces of the projection. The composite piston thus produced may be fitted with piston rings 43 as also of course may the pistons in the construction first described.

The advantage of this modified construction shown in Figures 4 and 5 is that, as will be appreciated, the pistons are virtually integral with the piston disc which carries them, and, in consequence, the construction is admirably suited to the thrust conditions prevailing in the engine as between the pistons and the disc.

It is to be understood, in accordance with the following statement of claim, that the invention described herein concerns both an improvement in aircraft, characterized by the combination hereinbefore set forth of an aircraft fuselage, a rotary internal combustion engine of the type specified and propeller blades mounted upon the rotating cylinder unit of the engine, and also the engine itself constructed of the large axial through-way form referred to, that is to say adapting it for use in said aircraft combination.

What I claim and desire to secure by Letters Patent of the United States is:—

1. In an airplane having a fuselage provided with a reduced portion presenting a flat annular surface spaced rearwardly from the nose of the fuselage, the combination with an engine mounted on said surface and comprising a rotating annular cylinder ring surrounding the same and lying closely adjacent thereto and having a plurality of cylinders formed therein, an independently rotatable annular piston disk carried by and surrounding said annular surface and also lying closely adjacent thereto and provided with a plurality of pistons operating in the cylinders, and propeller blades carried by the rotating cylinder ring, said annular surface providing an unobstructed passage interiorly thereof of sufficient area to permit a mechanic to pass therethrough.

2. In an airplane having a fuselage provided with a gradual slope toward its front end and having a reduced portion presenting a flat annular surface spaced rearwardly from the nose of the fuselage and providing an unobstructed passage interiorly thereof of sufficient area to permit a mechanic to pass therethrough, the combination with an engine mounted on said surface and projecting only slightly above the sloping surface of the fuselage to the rear of the engine, said engine comprising a rotating annular cylinder ring surrounding the flat surface and having a plurality of cylinders formed therein, an independently rotatable annular piston disk carried by and surrounding said annular surface and provided with a plurality of pistons operating in the cylinders, and propellers on said cylinder ring whereby the generally circular contour of the fuselage is maintained throughout the forwardly sloping portion of the fuselage including the engine mounting portion thereof, and whereby wind resistance of the engine is reduced.

HENRY SCHULMAN.